United States Patent [19]

Omata et al.

[11] Patent Number: 5,164,137
[45] Date of Patent: Nov. 17, 1992

[54] METHOD OF MOLDING SKIN-COVERED FOAMED ARTICLE

[75] Inventors: Youichi Omata; Norio Yanagishita, both of Kanagawa, Japan

[73] Assignee: Ikeda Bussan Co., Ltd., Ayase, Japan

[21] Appl. No.: 698,186

[22] Filed: May 6, 1991

Related U.S. Application Data

[63] Continuation of Ser. No. 370,039, Jun. 22, 1989, abandoned.

[30] Foreign Application Priority Data

Jun. 28, 1988 [JP] Japan ................................ 63-160186

[51] Int. Cl.⁵ ............................................. B29C 67/22
[52] U.S. Cl. .................................... 264/46.6; 156/79; 264/46.4
[58] Field of Search ............... 264/46.4, 46.6, 46.8; 156/79

[56] References Cited

U.S. PATENT DOCUMENTS

| | | | |
|---|---|---|---|
| 3,396,062 | 8/1968 | White | 264/550 |
| 4,115,170 | 9/1978 | Sanson | 264/46.6 |
| 4,116,736 | 9/1978 | Sanson et al. | 264/46.6 |
| 4,758,294 | 7/1988 | Storch | 264/46.6 |
| 4,833,741 | 5/1989 | Mizuno et al. | 264/46.6 |

FOREIGN PATENT DOCUMENTS

| | | | |
|---|---|---|---|
| 55-123455 | 9/1980 | Japan | 156/79 |
| 58-101027 | 6/1983 | Japan | 264/46.6 |
| 60-234809 | 10/1985 | Japan | 264/46.7 |
| 62-257825 | 11/1987 | Japan | 264/46.8 |

*Primary Examiner*—Allan R. Kuhns
*Attorney, Agent, or Firm*—Foley & Lardner

[57] ABSTRACT

A method of molding a skin-covered foamed article is disclose. The method includes the steps of (a) preparing a mold assembly has a lower mold which has a cavity formed therein and an upper mold which is adapted to be put on the lower mold to close the cavity, the lower mold including a fixed mold part which has around the bottom of the cavity a seat portion and a movable mold part which has a peripheral portion which is adapted to be seated on the seat portion; (b) preparing a bag-shaped outer skin member; (c) lining one surface of the bag-shaped outer skin member with a film to provide a film-lined bag-shaped outer skin member; (d) putting the film-lined bag-shaped outer skin member on the movable mold part in such a manner that the film constitutes an outermost layer of the outer skin member on the movable mold part and that at least the peripheral portion of the movable mold part is covered with the film; (e) moving the movable mold part to its operative position having the peripheral portion of the movable mold part intimately seated on the seat portion of the fixed mold with an interposal of the film therebetween; (f) pouring a liquid foamable material for foamed plastic into the cavity; and (g) putting the upper mold onto the lower mold to close the cavity and curing the foamable material.

10 Claims, 3 Drawing Sheets

METHOD OF MOLDING SKIN-COVERED FOAMED ARTICLE

This application is a continuation, of application Ser. No. 07/370,039, filed Jun. 22, 1989, now abandoned.

BACKGROUND OF THE INVENTION

1. Field of the Invention

The present invention relates in general to a method of molding a skin-covered article, and more particularly to a method of molding a skin-covered foamed article which may be used as an automobile seat cushion or the like.

2. Description of the Prior Art

Japanese Patent First Provisional Publication No. 61-280908 shows one of conventional methods for molding a skin-covered cushion for an automotive seat. In order to clarify the task of the present invention, the method of this publication will be described with reference to FIGS. 8 to 10 of the accompanying drawings.

In the drawings, a mold assembly 11 is shown as comprising an upper mold 12 and a lower mold 13. The lower mold 13 comprises a fixed mold part 13a which has a bored inner surface 13a' matching an outside surface of a seat cushion (see FIG. 10) which is to be produced, and a movable mold part 13b which has a protruded inner surface 17 matching a front surface of the produced seat cushion and is vertically movable relative to the fixed mold part 13a. The fixed mold part 13a is formed around the bored bottom thereof with a stepped seat portion 15 onto which a peripheral portion of the movable mold part 13b is adapted to be seated. A shaft 16 of a lift device (not shown) is secured to the movable mold part 13b to move the movable mold part 13b upward and downward.

The following steps are employed for molding the seat cushion.

The upper mold 12 is kept removed from the fixed mold part 13. By operating the lift device, the movable mold part 13b is lifted up beyond the fixed mold part 13a. A bag-shaped outer skin member 21, which has been turned inside out, is put on the movable mold part 13b. As is seen from FIG. 9, a center part 21a of the skin member 21, which is to cover a front surface 25a of a foamed pad member 25 which is to be molded, is tightly put on the protruded inner surface 17 of the movable mold part 13b, while, peripheral outer portions 21b of the skin member 21, which are to cover an outer surface 25b of the foamed pad member 25, are turned back and detachably fitted to the back portion of the movable mold part 13b by means of hooks 18.

Then, as is seen from FIG. 9, the movable mold part 13b is lowered to its operative position having the peripheral portion seated on the stepped seat portion 15 of the fixed mold part 13a. Then, a suitable amount of liquid foamable material 25' for foamed plastic, such as urethane foam or the like, is poured into the cavity of the lower mold 13 thus coupled. Then, as is seen from FIG. 10, the upper mold 12 is put on the lower mold 13 to close the cavity.

After the foamable material 25' is hardened to a sufficient level, the same, viz., the foamed pad member 25, is removed from the molds 12 and 13 along with the skin member 21. Then, the peripheral outer portions 21b of the skin member 21 are turned front to cover the outside surface of the foamed pad member 25.

However, the above-mentioned method has the following drawbacks due to its inherency.

That is, it tends to occur that, during pouring of the liquid foamable material 25' into the mold, a part of the same leaks out through the skin-pressed area which is defined between the stepped seat portion 15 of the fixed mold part 13a and the peripheral portion of the movable mold part 13b. This undesired leakage becomes much more severe when the skin member 21 is of a multi-plys type, such as a laminated sheet material including a plurality of urethane foam layers. The leakage induces not only deterioration in external appearance of the product but also production of an abnormally hardened part on the product.

SUMMARY OF THE INVENTION

It is therefore an object of the present invention to provide a method of molding a skin-covered foamed article, which method is free of the above-mentioned drawback.

According to the present invention, there is provided a method of molding a skin-covered foamed article. The method comprises by steps (a) preparing a mold assembly which comprises a lower mold which has a cavity formed therein and an upper mold which is adapted to be put on the lower mold to close the cavity, the lower mold including a fixed mold part which has around the bottom of the cavity a seat portion and a movable mold part which has a peripheral portion which is adapted to be seated on the seat portion, (b) preparing a bag-shaped outer skin member; (c) lining one surface of the bag-shaped outer skin member with a film to provide a film-lined bag-shaped outer skin member; (d) putting the film-lined bag-shaped outer skin member on the movable mold part in such a manner that the film constitutes an outermost layer of the outer skin member on the movable mold part and that at least the peripheral portion of the movable mold part is covered with the film; (e) moving the movable mold part to its operative position having the peripheral portion of the movable mold part intimately seated on the seat portion of the fixed mold with an interposal of the film therebetween; (f) pouring a liquid foamable material for foamed plastic into the cavity; and (g) putting the upper mold onto the lower mold to close the cavity and curing the foamable material.

BRIEF DESCRIPTION OF THE DRAWINGS

Other objects and advantages of the present invention will become apparent from the following description when taken in conjunction with the accompanying drawings, in which:

FIGS. 1 to 7 are drawings showing the method of the present invention, in which:

FIG. 1 is a sectional view of a mold assembly which is used for carrying out the method of the invention;

FIG. 2 is a sectional view of the mold assembly in a condition wherein a bag-shaped skin member is put on a movable mold part;

FIG. 3 is a sectional view of a heat press machine for lining a film on an outer skin member;

FIG. 4 is a sectional view of the mold assembly in a condition wherein a liquid foamable material is being poured into the mold;

FIG. 5 is a sectional view of the mold assembly in a condition wherein the liquid foamable material is being cured;

FIG. 6 is a sectional view of a foamed pad member which is molded by the mold assembly; and FIG. 7 is a sectional view of a produced seat cushion which is practically applied to a seat frame;

FIGS. 8 to 10 are drawings showing a conventional method, in which:

FIG. 8 is a sectional view of a mold assembly which is used for carrying out the conventional method;

FIG. 9 is a sectional view of the mold assembly in a condition wherein a liquid foamable material is being poured into the mold; and FIG. 10 is a sectional view of the mold assembly in a condition wherein the liquid foamable material is being cured.

DETAILED DESCRIPTION OF THE INVENTION

Figure 1:
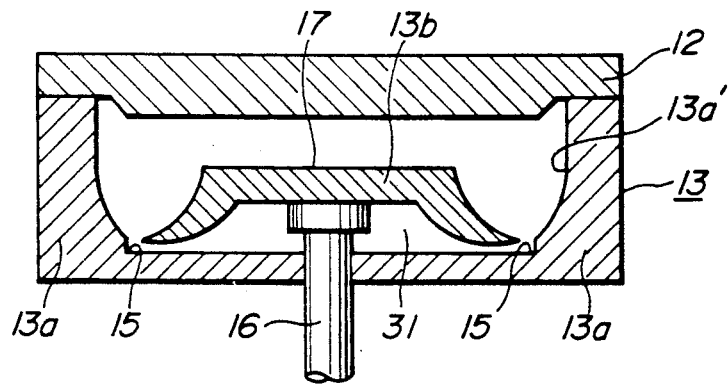

Referring to FIG. 1, there is shown a mold assembly 11 which is used for carrying out the method of the present invention.

The mold assembly 11 comprises an upper mold 12 and a lower mold 13. The lower mold 13 comprises a fixed mold part 13a which has an inner surface 13a' matching an outside surface of a seat cushion (see FIG. 7) which is to be produced, and a movable mold part 13b which has a protruded inner surface 17 matching a front surface of the produced seat cushion and is vertically movable relative to the fixed mold part 13a. It is to be noted that unlike the above-mentioned mold assembly of FIG. 8, the fixed mold part 13a has a closed bottom. The fixed mold part 13a is formed around the peripheral portion of the bottom thereof with a seat portion 15 onto which a peripheral portion of the movable mold part 13b is adapted to be seated. A shaft 16 of a lift device (not shown) is secured to the movable mold part 13b to move the movable mold part 13b upward and downward.

As will be understood from FIG. 1, when the movable mold part 13b is properly seated on the seat portion 15 of the fixed mold part 13a, there is defined therebetween an enclosed space 31.

In the present invention, the following steps are employed for producing a seat cushion.

The upper mold 12 is kept removed from the lower mold 13. By operating the lift device, the movable mold part 13b is lifted up beyond the fixed mold part 13a.

A bag-shaped outer skin member 21, lined with impervious plastic film 24 which has been turned inside out, is put on the movable fold part 13b. As is seen from FIG. 2, a center part 21a of the skin member 21, which is to cover a front surface 25a of a foamed pad member 25 which is to be molded, is tightly put on the protruded inner surface 17 of the movable mold part 13b, while, peripheral outer portions 21b of the outer skin member 21, which are to cover an outer surface 25b of the foamed pad member 25, are turned back and detachably fitted to the back portion of the movable mold part 13b by means of hooks 18.

Figure 2:
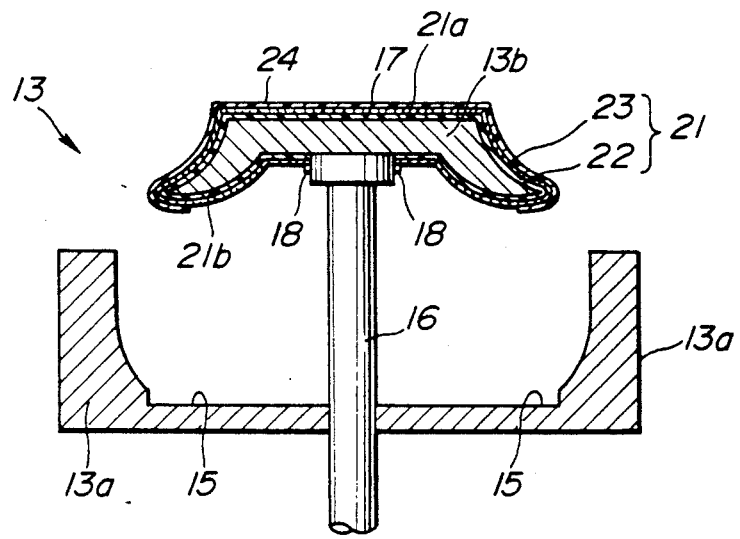
Figure 3:
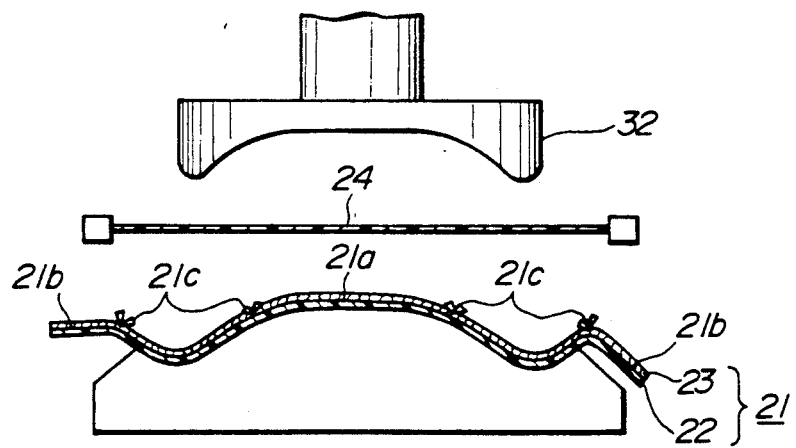

The skin member 21 used in the invention comprises an outer layer 22 and a wadding 23 affixed to the outer layer 22. As is seen from FIG. 3, the skin member 21 has several portions 21c stitched. An impervious flexible plastic film 24, such as NYLON (trade name) film, polyethylene film, polyvinylchloride film or the like, is attached to an exposed surface of the wadding 23. That is, as is seen from this drawing, the affixing of the film 24 to the wadding 23 is made by using a heat press machine 32. As will be seen from FIG. 2, the film has a size to sufficiently cover that portion of the skin member 21 which is turned back at the peripheral edge of the movable mold part 13b. That is, the film 24 is so sized as to cover the peripheral edge portion of the movable mold part 13b. As shown in FIGS. 2 and 3, an entire surface of the film 24 is affixed to a surface of the skin member 21 such that peripheral portions 21b of the skin member are not covered by the film.

Figure 4:
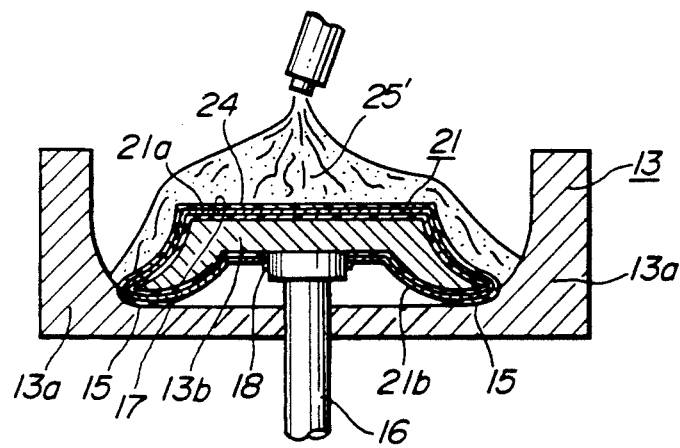
Figure 5:
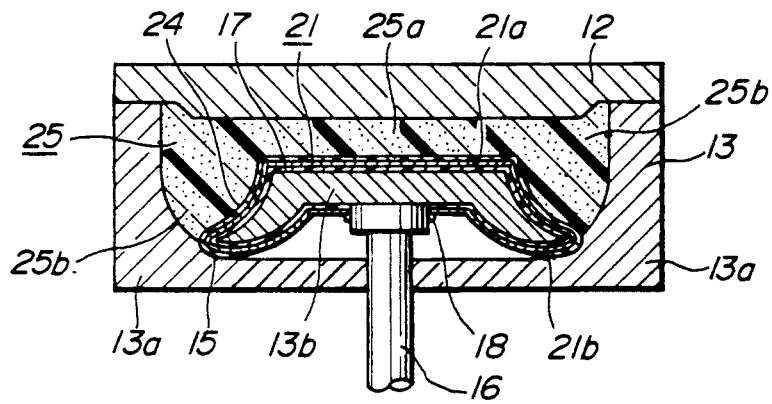

Then, the movable mold part 13b, on which the skin member 21 lined with the film 24 has been put, is lowered to its operative position having the peripheral portion thereof intimately seated on the seat portion 15 of the fixed mold part 13a. As is seen from FIG. 4, under this condition, the film 24 is pressed, together with the skin member 21, between the seat portion 15 of the fixed mold part 13a and the peripheral portion of the movable mold part 13b. Then, a suitable amount of liquid foamable material 25' for foamed plastic, such as, urethane foam or the like, is poured into the cavity of the lower mold 13 thus coupled. Then, as is seen from FIG. 5, the upper mold 12 is put on the lower mold 13 to close the cavity.

Figure 6:
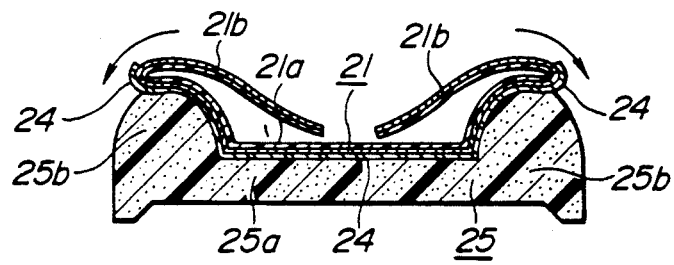

After the foamable material 25' is hardened to a sufficient level, the upper mold 12 is removed from the lower mold 13, and by operating the lift device, the movable mold part 13b is lifted beyond the fixed mold part 13a, along with the foamed pad member 25. Then, the foamed pad member 25 is removed from the movable mold part 13b together with the film-lined skin member 21. Then, as will be understood from FIG. 6, the peripheral outer portion 21b of the outer skin member 21 and thus a peripheral portion of the film 24 are turned front to cover the outside surface of the foamed pad member 25.

Figure 7:
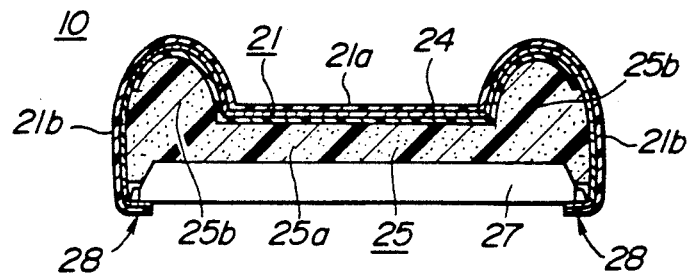
Figure 8:
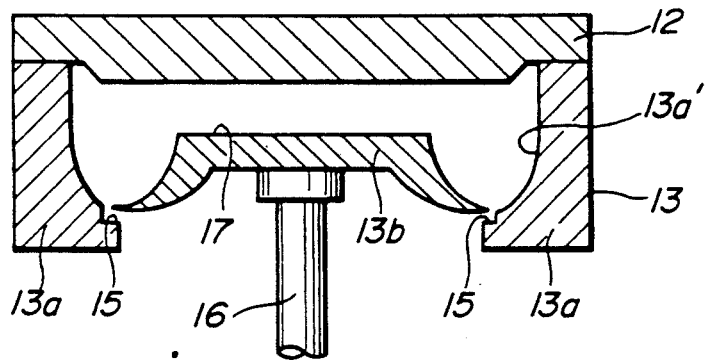
Figure 9:
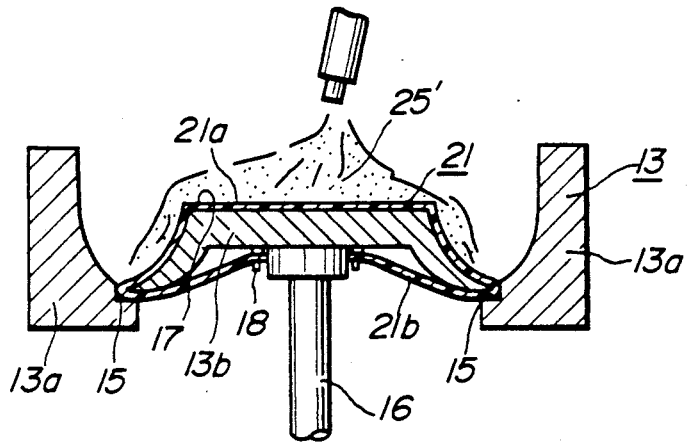
Figure 10:
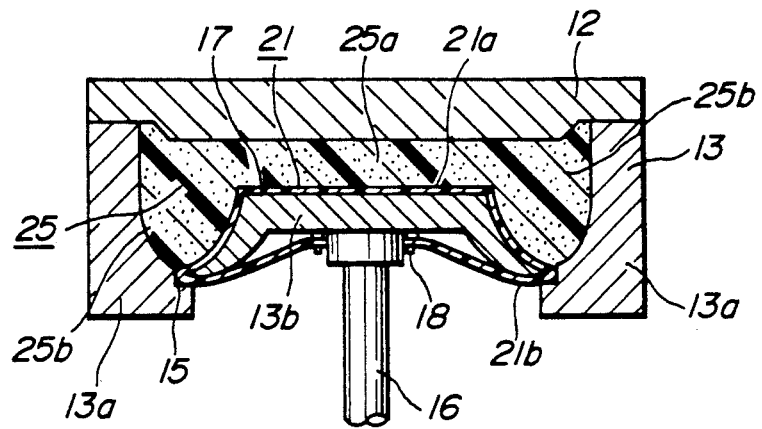

Then, as is seen from FIG. 7, the foamed pad member 25 is put on a seat frame 27, and the peripheral edge portions of the skin member 21 are fixed to suitable portions of the seat frame 27 by means of clips 28.

As has been described hereinabove, in accordance with the present invention, the flexible film 24 is used for assuring the sealing between the seat portion 15 of the fixed mold part 13a and the peripheral portion of the movable mold part 13b. Thus, the undesired material leakage does not occur during pouring of the material into the mold 13.

What is claimed is:

1. A method of molding a skin-covered foamed article, comprising by steps:
   (a) preparing a mold assembly which comprises a lower mold which has a cavity formed therein and an upper mold which is adapted to be put on said lower mold to close said cavity, said lower mold including a fixed mold part which has around the bottom of said cavity a seat portion, and a movable mold part which has a peripheral portion which is adapted to be seated on said seat portion;
   (b) preparing a bag-shaped outer skin member for a foamed article;
   (c) affixing, with an aid of a heat press machine, one entire surface of an impervious plastic film to a central major part of one surface of said bag-shaped outer skin member to provide said bag-shaped outer skin member, except a peripheral portion thereof, with an inner lining of said impervious plastic film;
   (d) turning said film-lined bag-shaped outer skin member inside out so that said lining is on the outside and putting said inside-out film-lined bag-shaped outer skin member on said movable mold part such that said impervious plastic film faces away from said movable mold part and that at least said peripheral portion of said movable mold part is covered with said film;

(e) moving said movable mold part to its oeprative position having said peripheral portion of said movable mold part intimately seated on said seat portion ofs aid fixed mold with an interposal of said impervious plastic film therebetween;

(f) pouring a liquid foamable material for foamed plastic into said cavity, said liquid foamable material contacting with said impervious plastic film, wherein leakage of said foamable material between said seat portion of said fixed mold part and said peripheral portion of said movable mold part is prevented; and (g) putting said upper mold onto said lower mold to close said cavity and curing said foamable material to produce a skin-covered foamed article.

2. A method as claimed in claim 1, further comprising before the step (d), a step (h) of displacing said movable mold part from said fixed mold part to facilitate the subsequent work of putting said outer skin member onto said movable mold part.

3. A method as claimed in claim 2, further comprising after the step (d), a step (i) of turning said peripheral portion of said outer skin member back and detachably engaging the same with a back portion of said movable mold part.

4. A method as claimed in claim 1, in which said film is constructed of a flexible plastic sheet.

5. A method as claimed in claim 1, further comprising after the step (g), a step (j) of removing said foamed article partially covered with said film, from said molds after said foamable material is hardened to a certain degree.

6. A method as claimed in claim 1, wherein a layer of wadding is affixed to said bag-shaped outer skin member and said impervious plastic film is affixed to said wadding.

7. A method as claimed in claim 1, wherein said fixed mold part defines a cavity.

8. A method as claimed in claim 7, wherein a layer of wadding is affixed to said bag-shaped outer skin member and said impervious plastic film is affixed to said wadding.

9. A method as claimed in claim 5, further comprising after the step (g), a step of displacing said movable mold part from said fixed mold part to facilitate removal of said product from said molds followed by a step of removing said foamed article partially covered with said film, from said molds after said foamable material is hardened to a certain degree.

10. A method as claimed in claim 5, further comprising after the step (g), a step of removing said foamed article partially covered with said film, from said molds after said foamable material is hardened to a certain degree followed by a step of turning back said peripheral portion of said outer skin member to cover an outer side surface of a foamed article with the same.

* * * * *